United States Patent
Jang (10) Patent No.: US 10,345,652 B2
(45) Date of Patent: Jul. 9, 2019

(54) ARRAY SUBSTRATE AND DISPLAY PANEL HAVING THE SAME

(71) Applicant: LG Display Co., Ltd., Seoul (KR)

(72) Inventor: Bomin Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 78 days.

(21) Appl. No.: 15/377,815

(22) Filed: Dec. 13, 2016

(65) Prior Publication Data

US 2017/0184900 A1  Jun. 29, 2017

(30) Foreign Application Priority Data

Dec. 28, 2015  (KR) .................. 10-2015-0187104

(51) Int. Cl.
| | |
|---|---|
| *G02F 1/1339* | (2006.01) |
| *G02F 1/1337* | (2006.01) |
| *G02F 1/1335* | (2006.01) |
| *G02F 1/1362* | (2006.01) |
| *G02F 1/1341* | (2006.01) |
| *G02F 1/1368* | (2006.01) |

(52) U.S. Cl.
CPC ........ *G02F 1/13394* (2013.01); *G02F 1/1337* (2013.01); *G02F 1/133512* (2013.01); *G02F 1/136227* (2013.01); *G02F 1/1341* (2013.01); *G02F 1/1368* (2013.01); *G02F 1/133514* (2013.01); *G02F 1/136286* (2013.01); *G02F 2001/13398* (2013.01); *G02F 2201/121* (2013.01); *G02F 2201/123* (2013.01); *G02F 2201/503* (2013.01); *G02F 2203/04* (2013.01)

(58) Field of Classification Search
None
See application file for complete search history.

(56) References Cited

U.S. PATENT DOCUMENTS

| | | | | |
|---|---|---|---|---|
| 6,362,865 B2* | 3/2002 | Yoshida | ............. | G02F 1/13394 349/122 |
| 8,854,579 B2* | 10/2014 | Chang | ............... | G02F 1/133512 349/110 |
| 9,507,215 B2* | 11/2016 | Choi | .................... | G02F 1/1368 |
| 9,658,498 B2* | 5/2017 | Shim | ................ | G02F 1/134309 |
| 2005/0140892 A1* | 6/2005 | Kim | ................. | G02F 1/133707 349/139 |
| 2013/0016298 A1* | 1/2013 | Shinokawa | ....... | G02F 1/134309 349/47 |

(Continued)

FOREIGN PATENT DOCUMENTS

| | | |
|---|---|---|
| KR | 10-2015-0004401 A | 1/2015 |
| KR | 10-2015-0017019 A | 2/2015 |
| KR | 10-2015-0125009 A | 11/2015 |

*Primary Examiner* — Dung T Nguyen
(74) *Attorney, Agent, or Firm* — Polsinelli PC (57) ABSTRACT

Disclosed herein is a display panel in which a space between a color filter substrate and an array substrate is filled with liquid crystals. The cell gap between the color filter substrate and the array substrate is maintained by a column spacer and a filling pattern with which a contact hole is filled. Accordingly, it is possible to stress damage to an alignment film by the movement of the column spacer even if the display panel is deformed by external force. In addition, the contact hole is filled with the filling pattern, thereby suppressing overcoming the problem of insufficient or excessive amount of liquid crystals.

18 Claims, 5 Drawing Sheets

(56) References Cited

U.S. PATENT DOCUMENTS

| | | | |
|---|---|---|---|
| 2013/0222723 A1* | 8/2013 | Kim | H01L 33/58 |
| | | | 349/40 |
| 2016/0187688 A1* | 6/2016 | Wen | G02F 1/1368 |
| | | | 349/43 |
| 2017/0038629 A1* | 2/2017 | Joo | G02F 1/13394 |
| 2017/0168347 A1* | 6/2017 | Li | G02F 1/133512 |

\* cited by examiner (PRIOR ART)

ARRAY SUBSTRATE AND DISPLAY PANEL HAVING THE SAME

CROSS-REFERENCE TO RELATED APPLICATION

This application claims the priority of Korean Patent Application No. 10-2015-0187104 filed in the Republic of Korea on Dec. 28, 2015, which is hereby incorporated by reference in its entirety.

BACKGROUND

Field of the Disclosure

The present disclosure relates to a display device, and more particularly, to an array substrate and a display panel having the same. Although the present disclosure is suitable for a wide scope of applications, it is particularly suitable for suppressing defects resulted from light leakage, insufficient liquid crystal, impact, etc., in the array substrate of the display panel.

Description of the Background

A display device essentially comprises a display panel, which includes an array substrate, a color filter substrate, and a liquid-crystal layer interposed between the array substrate and the color filter substrate. When electric field is applied across the display panel, the orientation of the liquid-crystal molecules in the liquid-crystal layer is changed, such that difference in transmittance is implemented.

Along with such difference in transmittance, combinations of color are reflected on light produced from a backlight disposed at the rear side of the display panel as the light passes through color filters, thereby representing color images.

Processes of fabricating such a display device include a substrate-fabricating process of fabricating an array substrate and a color filter substrate, a cell process of completing a display panel, and a module process of assembling the display panel and a backlight.

During the substrate-fabricating process, a series of process steps such as thin-film deposition, photolithography, and etching are repeated, so that an array layer and a color filter layer are implemented on the substrates. Subsequently, during the cell process, a seal pattern is formed on the array substrate or the color filter substrate for attaching the substrates to each other, and then the array substrate and the color filter substrate are attached together with a liquid-crystal layer filled therein, thereby completing a display panel. Thereafter, a polarizer plate, a driving circuit, etc., are attached to the display panel during the module process and then the display panel is assembled with a backlight, thereby implementing a display device.

In addition, spacers are inserted between the array substrate and the color filter substrate so as to maintain a gap therebetween.

The spacers may include ball spaces and column spacers, depending on the shape and processes of forming them. The ball spacers are formed by being sprayed on the array substrate or the color filter substrate. The column spacers are formed by being patterned on the array substrate or the color filter substrate. Since the column spacers can be formed at desired positions in a desired shape, it has been more preferred. The column spacers are typically formed on the color filter substrate, which undergoes the lesser number of processes than the array substrate.

Hereinafter, an in-plane switching mode display panel will be described in detail with reference to the accompanying drawings.

Figure 1:
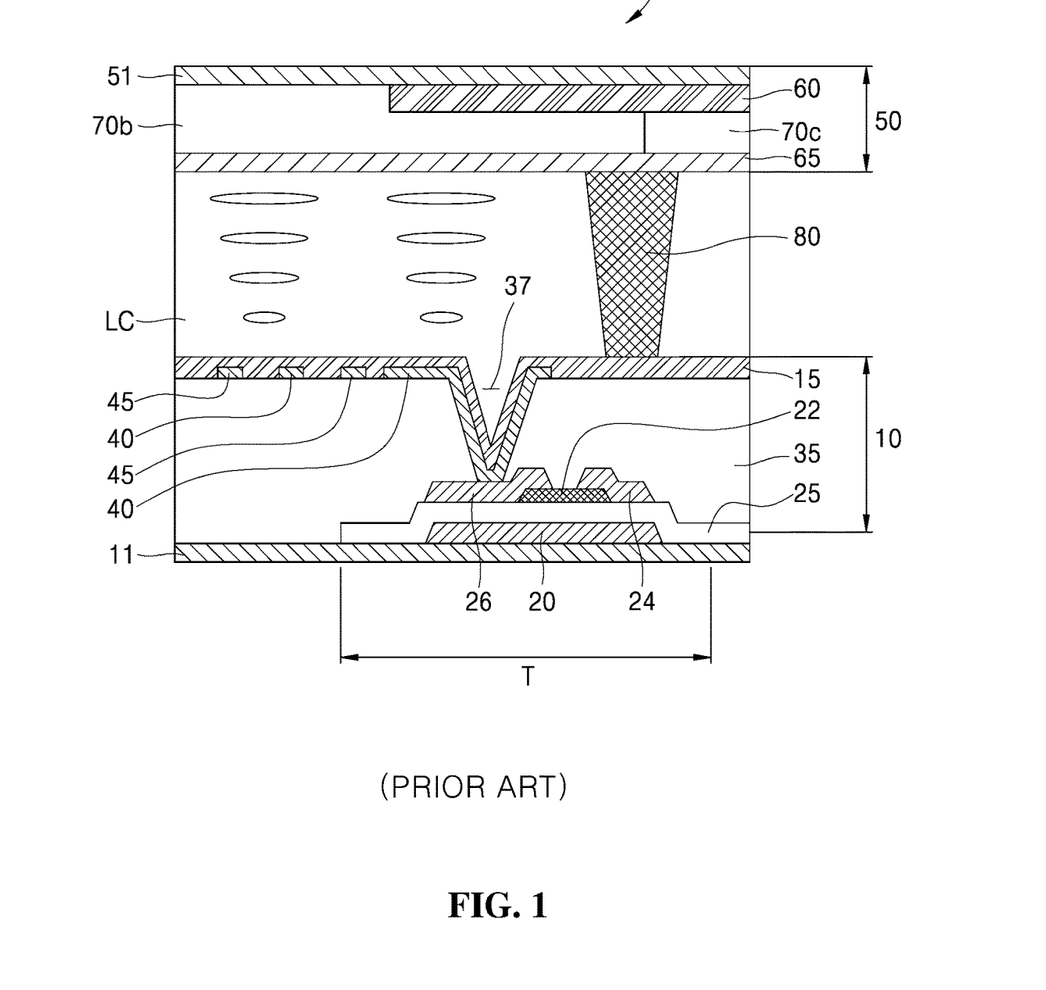
FIG. 1 is a cross-sectional view of an in-plane switching mode display panel.
Figure 2:
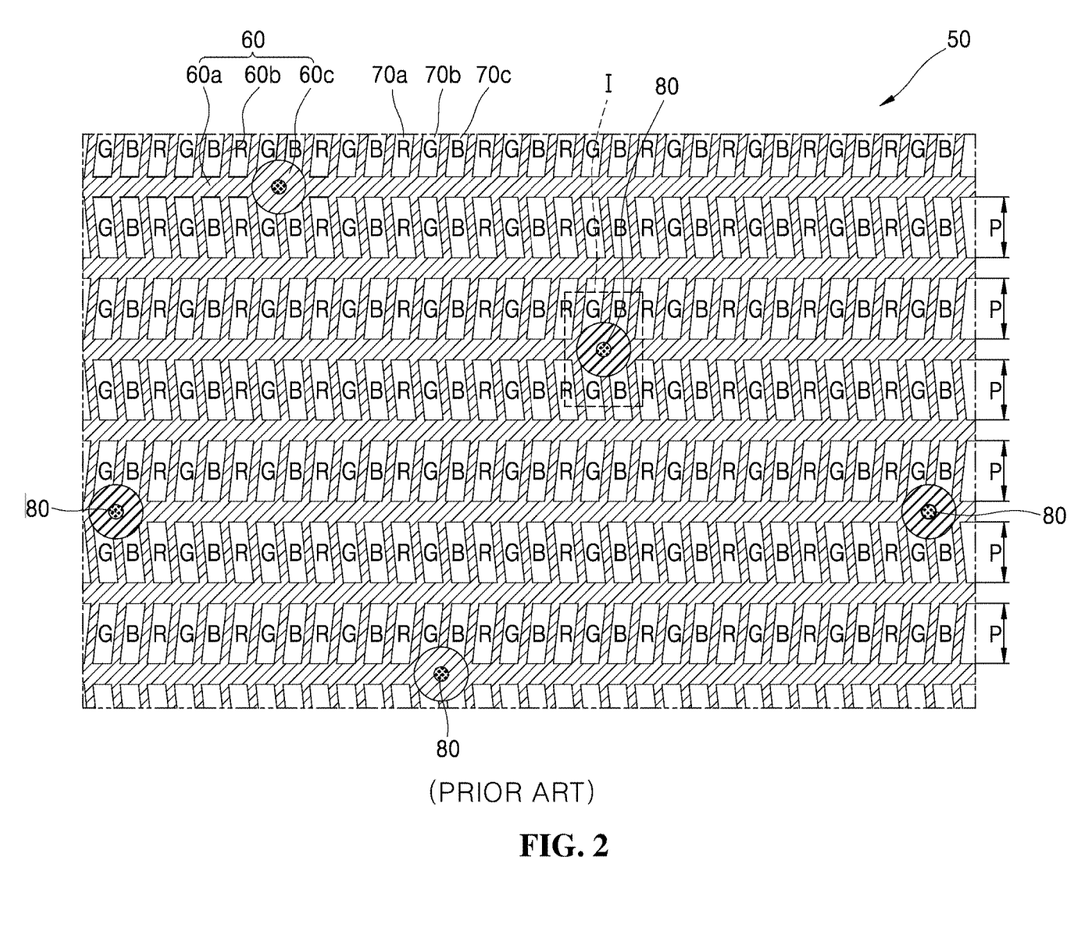
FIG. 2 is a plan view of a color filter substrate shown in FIG. 1.

FIG. 1 is a cross-sectional view of an in-plane switching mode display panel. FIG. 2 is a plan view of a color filter substrate shown in FIG. 1.

Referring to FIGS. 1 and 2, an in-plane switching mode display panel 1 includes an array substrate 10, a color filter substrate 50 facing the array substrate 10 and attached to each other, and a liquid-crystal layer LC disposed between the array substrate 10 and the color filter substrate 50 to fill the space therebetween. A plurality of pixel areas P is defined on each of the array substrate 10 and the color filter substrate 50.

The array substrate 10 includes a plurality of gate lines (not shown) extended in a first direction of a lower substrate 11, a plurality of common lines (not shown) extended in parallel with and spaced apart from the plurality of gate lines, a plurality of data lines (not shown) extended in a second direction intersecting the first direction, and a plurality of thin-film transistors T each disposed at the respective intersections between the gate lines and the data lines.

The thin-film transistor T includes a gate electrode 20, a gate insulation film 25 covering the gate electrode 20, a semiconductor layer 22 disposed on the gate insulation film 25 and overlapping the gate electrode 20, and a source electrode 24 and a drain electrode 26 disposed on the semiconductor layer 22 and spaced apart from each other. A contact hole 37 is formed via which a portion of the drain electrode 26 is exposed. A pixel electrode 40 is connected to the drain electrode 26 via the contact hole 37.

In addition, the array substrate 10 includes a protective layer 35 covering the plurality of data lines, the source electrode 24 and the drain electrode 26, and a lower alignment film 15 covering the pixel electrodes 40 and the common electrodes 45. The pixel electrode 40 and the common electrode 45 are formed of a transparent material so as to increase an aperture ratio.

The color filter substrate 50 includes: an upper substrate 51; a black matrix 60 corresponding to the plurality of gate lines, the plurality of common electrode, the plurality of data lines and the plurality of thin-film transistors T; red, green and blue color filters 70a, 70b and 70c sequentially disposed in the plurality of pixel areas on the upper substrate 51 and the black matrix 60, respectively; and an upper alignment film 65 covering the red, green and blue color filters 70a, 70b and 70c.

Although not shown in the drawings, the color filter substrate 50 further include an overcoat layer disposed between the red, green and blue color filters 70a, 70b and 70c and the upper alignment film 65.

The liquid-crystal layer LC is operated by the electric field horizontally applied though the pixel electrodes 40 and the common electrodes 45.

As described above, the liquid-crystal layer LC is disposed between the array substrate 10 and the color filter substrate 50 to fill the space therebetween. A column spacer 80 is formed between the array substrate 10 and the color filter substrate 50 to maintain a cell gap therebetween.

The column spacer 80 is formed by being patterned on the substrate 10 or the color filter substrate 50, frequently on the color filter substrate 50 which undergoes the lesser number of processes. The column spacer 80 is typically disposed where it overlaps the black matrix 60, more specifically, the thin-film transistor T.

When external force is applied to the in-plane switching mode display panel 1, the array substrate 10 or the color filter substrate 50 can be moved horizontally. As a result, the column spacer 80 is also moved to the left or the right side with respect to the thin-film transistor T.

When this happens, the surface of the lower alignment film 15 near the column spacer 80 can be damaged as the column spacer 80 is moved, and accordingly light leakage (i.e., red eye defect) can occur in the in-plane switching mode display panel 1.

That is, if the column spacer 80 is moved to the pixel area P by external force such that a scratch is formed on the surface of the lower alignment film 15 covering the protective layer 35 of the array substrate 10, the portion of the lower alignment film 15 near the column spacer 80 loses alignment property. Accordingly, the polarization properties of the liquid crystals located at the portion of the alignment film become different from the normal portions, thereby resulting in a red eye defect.

To increase the transmittance of the display panel 1, there is ongoing effort to gradually reduce the line width of the column spacer 80 and the line width of the black matrix 60. However, when the line width of the black matrix 60 is reduced, there is a problem in that a failure rate is increased due to the movement of the column spacer 80.

In addition, the contact hole 37 formed in the array substrate 10 can contribute to a defect during the process of forming the lower alignment film 15. The lower alignment film 15 is applied on the surface of the array substrate 10 by transferring a polyimide resin with a mask.

However, the contact hole 37 is a recessed portion of the array substrate 10, and if the contact hole 37 is not completely filled with the transferred polyimide solution, the thickness of the portion of the alignment film 15 near the contact hole 37 can be insufficient.

In addition, the contact hole 37 can be the main cause of the defect during the process of filling the space between the color filter substrate 50 and the array substrate 10 with liquid crystals.

The space between the color filter substrate 50 and the array substrate 10 can be filled with liquid crystals. The amount of the liquid crystals has to be appropriate. If the amount is insufficient, light leakage occurs. If the amount is excessive, yellow mura occurs. The volume between the color filter substrate 50 and the array substrate 10 is calculated theoretically, and the liquid crystals are applied by the amount corresponding to a certain percentage of the theoretically-calculated volume.

However, the shape of the contact hole 37 may vary depending on the thermal process for curing the protective layer 35. If the shape of the contact hole 37 changes, the cell gap is changed, resulting in a substantial change in the volume of the space filled with liquid crystals. As a result, the amount of the liquid crystals becomes problematic, contributing to defect on the display panel.

In view of the above, aspects of the present disclosure provide a structure that can suppress defects resulted from the contact hole and the column spacer in a display panel.

SUMMARY

Accordingly, the present disclosure is directed to an array substrate and a display panel having the same that substantially obviate one of more problems due to limitations and disadvantages of the prior art.

It is an object of the present disclosure to provide an array substrate capable of suppressing defects resulted from the movement of a column spacer between an array substrate and a color filter substrate.

It is another object of the present disclosure to provide a display panel capable of maintaining a cell gap uniformly by improving the surface flatness of a portion of an array substrate where a column spacer meets it.

It is yet another object of the present disclosure to provide a display panel capable of suppressing grain defects caused by the shape of the contact hole in the array substrate.

According to an exemplary embodiment of the present disclosure, a filling pattern is disposed to fill a contact hole in an array substrate, thereby suppressing defects caused by insufficient or excessive amount of liquid crystals due to the contact hole. In addition, an alignment film can be implemented more uniformly, thereby suppressing grain defects caused by uneven thickness of the alignment film.

In addition, in a display panel according to an exemplary embodiment of the present disclosure, a filling pattern protrudes from an upper surface of a protective film, and a column spacer disposed on a color filter substrate is supported by the filling pattern.

This structure can suppress damage to the alignment film on the array substrate by the column spacer when the color filter substrate slips on the array substrate.

To this end, the filling pattern may have a height corresponding to approximately 30 to 70% of the cell gap and may protrude from the upper surface of the protective film.

This is to suppress damage to the alignment film by the movement of the column spacer when the color filter substrate slips on the array substrate.

In addition, in a display panel according to an exemplary embodiment of the present disclosure, a plurality of contact holes may be filled with a single filling pattern. If a filling pattern is formed for every single contact hole, the recessed shape of the contact hole is transferred to the upper surface of the filling pattern, such that level differences may be made on the upper surface of the filling pattern.

In contrast, if a plurality of contact holes is filled with a single filling pattern, the flatness of the upper surface of the filling pattern is improved, such that deviation in the cell gap of the display panel and in turn deviation in quality can be reduced.

The column spacer disposed on the color filter substrate and the filling pattern disposed on the array substrate may be made of the same material.

Since the column spacer meets the filling pattern, friction is caused therebetween when external force is exerted. Accordingly, it is desired that they are made of the same material to stress damage by the friction.

In an array substrate according to an exemplary embodiment of the present disclosure, a contact hole via which a pixel electrode is connected to a switching element is filled with a filling pattern, and an alignment film is disposed thereon. Accordingly, it is possible to mitigate problems that the alignment film is not formed near the contact hole or the thickness of the alignment film is insufficient.

The display panel according to the exemplary embodiment of the present disclosure has a structure in which a cell gap between a color filter substrate and an array substrate is maintained by a column spacer disposed on the color filter substrate and a filling pattern disposed on the array substrate. The structure can suppress the problem that the alignment film of the array substrate is damaged by the column spacer if the color filter substrate slips on the array substrate.

In addition, the display panel according to an exemplary embodiment of the present disclosure provides the structure in which the contact hole of the array substrate is filled with the filling pattern, such that the volume of the space between the color filter substrate and the array substrate to be filled with liquid crystals is reduced. Accordingly, the amount of liquid crystals used in fabricating a display panel is reduced, thereby saving the cost.

It is to be understood that both the foregoing general description and the following detailed description are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate aspect(s) of disclosure and together with the description serve to explain the principle of the disclosure.

In the drawings.

DETAILED DESCRIPTION

Reference will now be made in detail to the aspects of the present disclosure, examples of which are illustrated in the accompanying drawings. Whenever possible, the same reference numbers will be used throughout the drawings to refer to the same or like parts.

In the following description, the terms first, second, third and the like are used for distinguishing between similar elements and not necessarily for describing a sequential or chronological order. The terms are only used to differentiate one component from other components.

It will be understood that when an element is referred to as being "on" another element, the element may be directly on another element or intervening elements may also be present.

Hereinafter, an array substrate according to an aspect of the present disclosure and a display panel having the same will be described with reference to the accompanying drawings.

Figure 3:
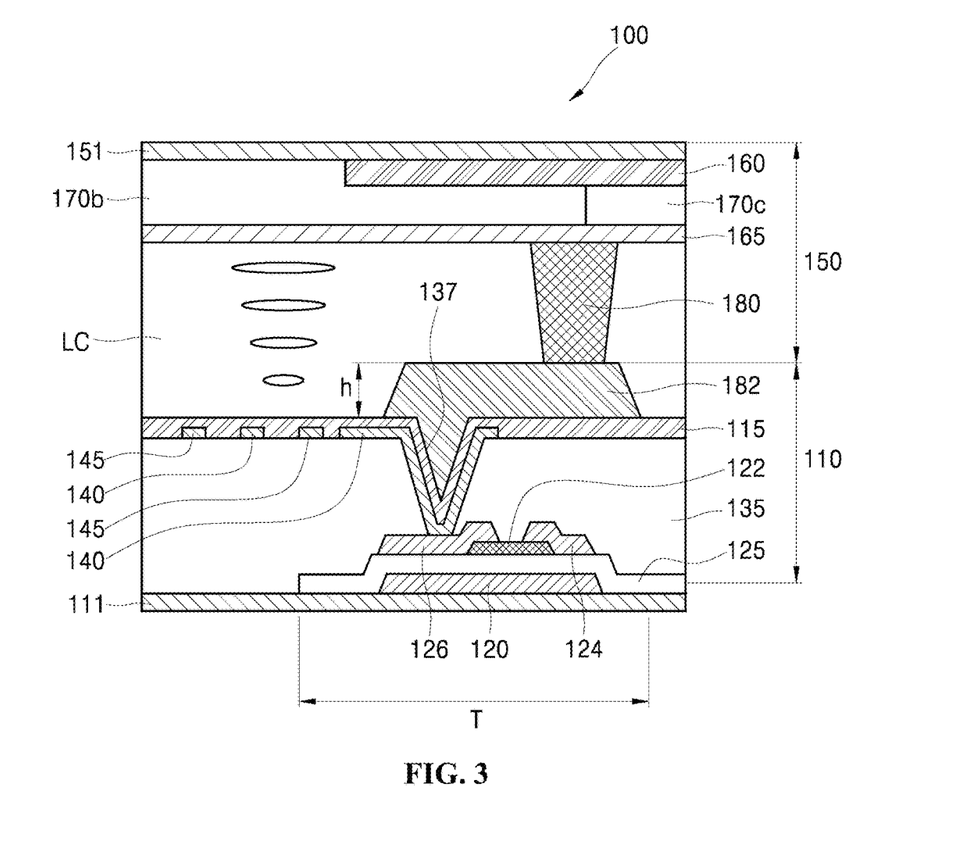
FIG. 3 is a cross-sectional view of a display panel according to an aspect of the present disclosure.

FIG. 3 is a cross-sectional view of a display panel according to an aspect of the present disclosure.

Referring to FIG. 3, a display panel 100 according to an aspect of the present disclosure includes an array substrate 110 and a color filter substrate 150 that have a plurality of pixel areas defined thereon, respectively, face each other and are spaced apart from each other, and a liquid-crystal layer LC disposed between the array substrate 110 and the color filter substrate 150 to fill the space therebetween.

Also, the array substrate 110 includes a plurality of circuit patterns formed therein. The plurality of circuit patterns includes a plurality of gate lines extended in a first direction of a lower substrate 111, a plurality of common lines extended in parallel with and spaced apart from the plurality of gate lines, and a plurality of data lines extended in a second direction intersecting the first direction to define a plurality of pixel areas.

Further, the array substrate 110 includes a plurality of thin-film transistors T each disposed at the respective intersections between the gate lines and the data lines, a plurality of pixel electrodes 140 connected to the thin-film transistors T and disposed in the pixel areas, and a plurality of common electrodes 145 each connected to the respective common lines and disposed in the pixel areas such that the plurality of common electrodes 145 are alternately spaced apart from the pixel electrodes 140.

In addition, the array substrate 110 includes a protective layer 135 covering the plurality of data lines, a source electrode 124 and a drain electrode 126, and a lower alignment film 115 covering the protective layer 135, the pixel electrodes 140 and the common electrodes 145.

The thin-film transistor T includes a gate electrode 120, a gate insulation film 125 covering the gate electrode 120, a semiconductor layer 122 disposed on the gate insulation film 125 and overlapping the gate electrode 120, and a source electrode 124 and a drain electrode 126 disposed on the semiconductor layer 122 and spaced apart from each other. The source electrode 124 branches off from the data lines, and the gate electrode 120 may be part of the gate lines.

The pixel electrodes 140 are disposed in the pixel area and are electrically connected to the drain electrode 126 via a contact hole 137. The common electrodes 145 branches off from the common lines and are alternately disposed with the pixel electrodes 140 in parallel at the pixel area.

The display panel according to the present disclosure further includes a filling pattern 182 filling the contact hole 137. The contact hole 137 is an essential element since it electrically connects the drain electrode 126 with the pixel electrode 140 each having a different height. However, as described above, the contact hole 137 has a recessed shape and accordingly can result in problems such as insufficient or excessive amount of liquid crystal, ununiformed thickness of the lower alignment, etc.

In this regard, in the display panel according to the present disclosure, the filling pattern 182 is formed by adding a layer over the contact hole 137, thereby mitigating the problem resulted from insufficient or excessive amount of liquid crystal. By filling the contact hole 137 with the filling pattern 182, the amount of liquid crystal to be used can be saved as much as the volume of the filling pattern 182. In addition, even if the shape of the contact hole 137 is changed during a baking process, it does not affect the amount of the liquid crystal to be used.

Further, in the display panel according to the present disclosure, the filling pattern 182 is formed to protrude from the protective layer 135 upwardly so that a column spacer 180 can be supported by the filling pattern 182. In other words, a cell gap can be maintained by both of the column spacer 180 and the filling pattern 182, not just solely by the column spacer 180.

Such a cell gap structure can suppress damage to the lower alignment film 115 due to the movement of the column spacer 180 when the color filter substrate 150 slips on the array substrate 110.

In the structure where the cell gap is maintained solely by the column spacer 180, the column spacer 180 is in contact with the surface of the lower alignment film 115, and thus the lower alignment film 115 is damaged when the column spacer 180 moves.

In contrast, in the display panel 100 according to the present disclosure where the cell gap is maintained by both of the column spacer 180 and the filling pattern 182, the lower alignment film 115 is not damaged due to the movement of the column spacer 180 even if the column spacer 180 moves out of the filling pattern 182, since the column spacer 180 is not in contact with the lower alignment film 115 but is separated apart from the lower alignment film 115.

The filling pattern 182 is formed to protrude from the surface of the other portion of the array substrate 110 (i.e., the protective layer) by a height h. The height h of the filling pattern 182 may be about 30 to 70% of the cell gap in the display panel.

When the height h of the filling pattern 182 is about 30% of the cell gap, the height of the column spacer 180 becomes about 70% of the cell gap. When the height h of the filling pattern 182 is about 70% of the cell gap, the height of the column spacer 180 becomes about 30% of the cell gap. In other words, the higher the filling pattern 182 the cell gap, the lower the column spacer 180 in the cell gap in the present disclosure.

The height of the filling pattern 182 less than about 30% of the cell gap may not be desired because the lower alignment film 115 is likely to be damaged by the column spacer 180 when the array substrate 110 slips on the color filter substrate 150.

On the other hand, the height of the filling pattern 182 more than about 70% of the cell gap may not be desired, because the upper alignment film 165 is likely to be damaged by the filling pattern 182 when the array substrate 110 slips on the color filter substrate 150.

In addition to maintaining the cell gap together with the column spacer 180, the filling pattern 182 also serves to reduce an amount of liquid crystal and mitigate deviation in quality.

In order to maintain the cell gap, the filling pattern 182 may be disposed only at a location where the column spacer 180 is formed. It is to be understood that the column spacer 180 may be formed in every contact hole 137 to reduce the amount of the liquid crystal.

The color filter substrate 150 includes: an upper substrate 151; a black matrix 160 corresponding to the plurality of gate lines, the plurality of common electrode, the plurality of data lines and the plurality of thin-film transistors T; red, green and blue color filters 170a, 170b and 170c disposed in the plurality of pixel areas on the upper substrate 151 and the black matrix 160, respectively, in this order; and an upper alignment film 165 covering the red, green and blue color filters 170a, 170b and 170c. The liquid-crystal layer LC is operated by the electric field horizontally applied through the pixel electrodes 140 and the common electrodes 145.

The column spacer 180 is disposed on the color filter substrate 150 and is positioned so that it can be supported by the filling pattern 182.

In the display panel according to the present disclosure, the cell gap is maintained not solely by the column spacer but by the sum of the height of the filling pattern and the height of the column spacer, and accordingly the column spacer 180 has to be in line with the filling pattern 182.

Incidentally, as the filling pattern 182 contacts the column spacer 180 to maintain the cell gap, friction may be caused between the filling pattern 182 and the column spacer 180 when the array substrate slips on the color filter substrate due to an external force.

To suppress damage on the filling pattern 182 and the column spacer 180 due to the repeated frictions, the filling pattern 182 and the column spacer 180 may have similar hardness. To this end, the filling pattern 182 and the column spacer 180 may be formed of the same material or the similar material.

Figure 4:
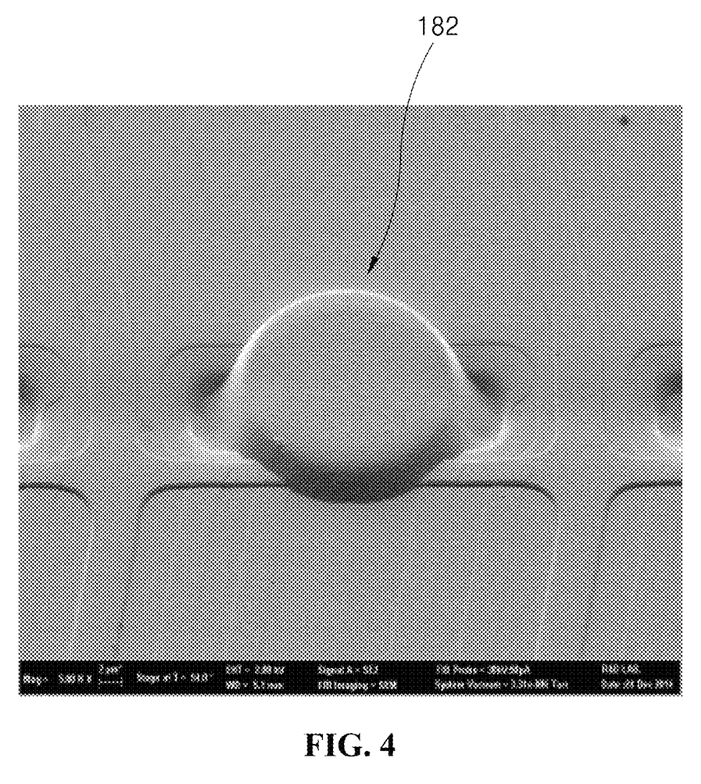
FIG. 4 is an enlarged photographic image of a fill pattern according to an aspect of the present disclosure.
Figure 5:
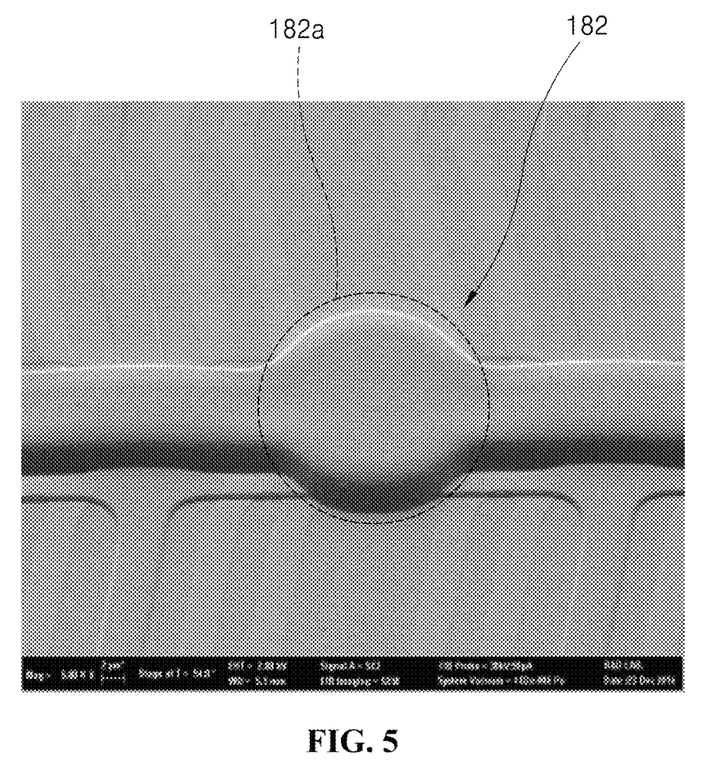
FIG. 5 is an enlarged photographic image of a fill pattern according to another aspect of the present disclosure.

FIG. 4 is an enlarged photographic image of a filling pattern according to an aspect of the present disclosure. FIG. 5 is an enlarged photographic image of a filling pattern according to another aspect of the present disclosure.

As shown in FIG. 4, two contact holes are filled with a single filling pattern. As shown in FIG. 5, a plurality of contact holes arranged in line is filled with a single filling pattern.

In the display panel according to the present disclosure, the contact hole is filled with the filling pattern 182, and the filling pattern 182 contacts the column spacer to maintain the cell gap. Accordingly, the upper surface of the filling pattern 182 is formed to be as flat as possible.

If there is a height difference on the upper surface of the filling pattern 182, the cell gap can be changed depending on the location where the column spacer is supported. Such a change in the cell gap can seriously affect the deviation in quality. If the cell gap is increased, the cell gap cannot be fully filled with a given amount of the injected liquid crystal. If the cell gap is decreased, the cell gap is excessively filled with a given amount of the liquid crystal.

On the other hand, the flatness of the upper surface of the filling pattern varies depending on the shape of the filling pattern 182.

When a single contact hole is filled with a single filling pattern, the feature of the center portion of the contact hole is transferred to the filling pattern, such that the center portion of the filling pattern may be recessed.

As the upper surface of the filling pattern supports the column spacer, the height difference on the upper surface of the filling pattern results in a change in the cell gap. Accordingly, the upper surface of the filling pattern needs to be as flat as possible.

When two contact holes are filled with a single filling pattern as shown in FIG. 4, the measured height difference (flatness measurement) on the upper surface of the filling pattern is approximately 0.21 µm or less in the horizontal direction (i.e., gate line direction) and the measured height difference (flatness measurement) is approximately 0.15 µm or less in the vertical direction (i.e., data line direction).

When a series of contact holes arranged in line are filled with a single filling pattern as shown in FIG. 5, the flatness measurement on the upper surface of the filling pattern is approximately 0.19 µm or less in the horizontal direction (gate line direction) and the flatness measurement is approximately 0.15 µm or less in the vertical direction (data line direction). Accordingly, a plurality of contact holes is filled with a single filling pattern.

When the filling pattern 182 has a rod-shape that fills the contact holes in line as shown in FIG. 5, an expanded portion 182a (circular shape) wider than other portions (straight line shape) is formed to correspond to the area where the column spacer 180 is disposed on the color filter substrate 150.

The expanded portion 182a supports the column spacer 180 and has a wider horizontal area, such that the column spacer 180 can be supported by the filling pattern 182 more stably. Although the shape of the expanded portion 182a is shown as a circular shape in FIG. 5, the shape of the expanded portion 182a is not limited to a circle, and other shapes are possible. For example, it can be formed into a wide band shape having a relatively wide width.

In the display panel according to the present disclosure, an additional layer is formed over a contact hole that is an essential element of the array substrate to thereby form a filling pattern, and the column spacer is supported by the filling pattern. As a result, a cell gap is maintained by the filling pattern and the column spacer.

In this structure, the lower end of the column spacer is spaced apart from the lower alignment film of the array substrate, and thereby preventing the lower alignment film from being damaged by the movement of the column spacer.

Although the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure provided they come within the scope of the appended claims and their equivalents.

What is claimed is:

1. An array substrate of a display panel, comprising:
a lower substrate;
a switching element disposed on the lower substrate;
a protective layer having at least one contact hole exposing a portion of the switching element;
a plurality of pixel electrodes electrically connected to the switching element through the at least one contact hole;
a plurality of common electrodes on the protective layer;
a lower alignment film on the protective layer including the pixel electrodes; and
a filling pattern disposed on the lower alignment film and filling the at least one contact hole including the lower alignment film, wherein the filling pattern has a first portion and a second portion extended from the first portion, the first portion corresponds to the at least one contact hole, and the second portion located outside the at least one contact hole and corresponds to an area where a column spacer is disposed.

2. The array substrate of claim 1, wherein the at least one contact hole comprises two or more contact holes filled with a single filling pattern.

3. The array substrate of claim 2, wherein the single filling pattern has an upper surface having flatness measurements of not greater than 0.19 μm in a gate line direction and not greater than 0.15 μm in a data line direction.

4. The array substrate of claim 1, wherein the filling pattern occupies in a predetermined cell gap in a range of about 30 to 70% in vertical height.

5. The array substrate of claim 4, wherein the predetermined cell gap is maintained by both the column spacer and the filling pattern.

6. The array substrate of claim 1, wherein the first portion has is a circular shape and the second portion has a straight line, wherein the first portion is wider than the second portion.

7. The array substrate of claim 6, wherein the column spacer and the filling pattern are formed of the same material a similar material having the same or similar hardness.

8. The array substrate of claim 6, wherein the column spacer and the filling pattern are in direct contact in a vertical direction.

9. The array substrate of claim 1, wherein each of the pixel electrodes and the common electrodes is alternately disposed with each other on the protective layer.

10. A display panel comprising:
an array substrate comprising;
a lower substrate,
a switching element disposed on the lower substrate,
a protective layer having at least one contact hole exposing a portion of the switching element,
a plurality of pixel electrodes electrically connected to the switching element through the at least one contact hole,
a plurality of common electrodes on the protective layer,
a lower alignment film on the protective layer including the pixel electrodes, and
a filling pattern disposed on the lower alignment film and filling the at least one contact hole including the lower alignment film;
a color filter substrate comprising;
an upper substrate having a plurality of pixel areas,
a black matrix having openings each exposing the respective pixel areas on the upper substrate, and
red, green and blue color filters arranged sequentially in a first direction and disposed in the pixel areas, respectively,
a column spacer overlapping the black matrix on the color filter substrate; and
a liquid-crystal layer disposed between the array substrate and the color filter substrate to fill a cell gap therebetween,
wherein the column spacer is supported by the filling pattern and the cell gap between the color filter substrate and the array substrate is a sum of a height of the column spacer and a height of the filling pattern from the lower alignment film.

11. The array substrate of claim 10, wherein a height of the filling pattern from an upper surface of the lower alignment film corresponds to 30 to 70% of the cell gap.

12. The display panel of claim 10, wherein the least one contact hole comprises two or more contact holes filled with a single fill pattern.

13. The display panel of claim 10, wherein the first portion has a circular shape and the second portion has a straight line shape, wherein the first portion is wider than the second portion.

14. The display panel of claim 10, wherein the column spacer and the single filling pattern are formed of the same material a similar material having the same or similar hardness.

15. The display panel of claim 10, wherein the cell gap is maintained by both the column spacer and the filling pattern.

16. The array substrate of claim 10, wherein each of the pixel electrodes and the common electrodes is alternately disposed with each other on the protective layer.

17. The array substrate of claim 10, wherein the column spacer and the filling pattern are in direct contact in a vertical direction.

18. The array substrate of claim 10, wherein the single filling pattern has an upper surface having flatness measurements of not greater than 0.19 μm in a gate line direction and not greater than 0.15 μm in a data line direction.

* * * * *